US007363052B2

(12) United States Patent
Lamensdorf

(10) Patent No.: US 7,363,052 B2
(45) Date of Patent: Apr. 22, 2008

(54) INFORMATION DISTRIBUTION SYSTEM FOR IMPROVED RESPONSE TO SAFETY AND SECURITY INCIDENTS

(76) Inventor: David M. Lamensdorf, 26011 Somba Ct., Valencia, CA (US) 91355

( * ) Notice: Subject to any disclaimer, the term of this patent is extended or adjusted under 35 U.S.C. 154(b) by 97 days.

(21) Appl. No.: 10/215,690

(22) Filed: Aug. 9, 2002

(65) Prior Publication Data

US 2004/0204048 A1    Oct. 14, 2004

(51) Int. Cl.
 *H04M 1/00* (2006.01)
(52) U.S. Cl. ............... 455/556.1; 455/521; 455/404.1; 455/41.2
(58) Field of Classification Search ............... 455/556, 455/90.2, 550.1, 456, 517, 521, 404.1, 41.2, 455/556.1, 456.2, 404.2; 705/2, 4; 340/932.2, 340/825.52
See application file for complete search history.

(56) References Cited

U.S. PATENT DOCUMENTS

| 5,256,908 | A | * | 10/1993 | Averbuch et al. ............. 367/99 |
| 5,986,568 | A | * | 11/1999 | Suzuki et al. .......... 340/825.52 |
| 6,763,226 | B1 | * | 7/2004 | McZeal, Jr. ................ 455/90.2 |
| 6,891,838 | B1 | * | 5/2005 | Petite et al. ................ 370/401 |
| 2002/0055861 | A1 | * | 5/2002 | King et al. ..................... 705/4 |
| 2002/0058499 | A1 | * | 5/2002 | Ortiz ........................... 455/412 |
| 2002/0099858 | A1 | * | 7/2002 | Lindo et al. ................ 709/250 |
| 2002/0179711 | A1 | * | 12/2002 | Hileman ..................... 235/454 |
| 2003/0036391 | A1 | * | 2/2003 | Jordan ........................ 455/456 |
| 2003/0178485 | A1 | * | 9/2003 | Lee ............................. 235/435 |
| 2003/0191666 | A1 | * | 10/2003 | Kline ............................ 705/2 |
| 2003/0204371 | A1 | * | 10/2003 | Sciamanna ................. 702/183 |
| 2003/0212893 | A1 | * | 11/2003 | Hind et al. ................. 713/177 |
| 2003/0222792 | A1 | * | 12/2003 | Berman et al. .......... 340/932.2 |
| 2004/0008253 | A1 | * | 1/2004 | Monroe ...................... 348/143 |
| 2004/0073453 | A1 | * | 4/2004 | Nenov et al. ................... 705/2 |

* cited by examiner

*Primary Examiner*—Tan Trinh
(74) *Attorney, Agent, or Firm*—Law Offices of Natan Epstein

(57) ABSTRACT

A field deployable data processing and communications device such as a portable personal digital assistant (PDA) device is configured and programmed for collecting local information such as environmental, chemical or biological data, images and voice messages, at the scene of an incident of a nature which requires intervention by public safety or law enforcement agencies. The PDA is deployed at the incident scene by first response personnel and provides a conduit for seamlessly conveying information collected by the PDA at the scene to remote facilities and agencies, which may be chosen for their ability to deal with and respond to situations of a particular nature, thereby reducing delays and improving efficiency of response to public safety and security incidents.

10 Claims, 2 Drawing Sheets

INFORMATION DISTRIBUTION SYSTEM FOR IMPROVED RESPONSE TO SAFETY AND SECURITY INCIDENTS

BACKGROUND OF THE INVENTION

1. Field of the Invention

A field deployable data processing and communications device such as a portable personal digital assistant (PDA) device is configured and programmed for collecting local information such as environmental, chemical or biological data, images and voice messages, at the scene of an incident of a nature which requires intervention by public safety or law enforcement agencies. The PDA is deployed at the incident scene by first response personnel and provides a conduit for seamlessly conveying information collected by the PDA at the scene to remote facilities and agencies, which may be chosen for their ability to deal with and respond to situations of a particular nature, thereby reducing delays and improving efficiency of response to public safety and security incidents.

2. State of the Prior Art

Dramatically increased demand for rapid and effective deployment of public safety and security resources has shown that existing procedures and equipment are inadequate in the face of the threats which have to be faced. The ever present threat of terrorist attack, both foreign and home-grown, the possibility of epidemic disease introduced from foreign sources, intentionally or accidentally, the release of hazardous substances whether chemical, biological, or radioactive, all present potential scenarios which require rapid and effective deployment of resources in response to a potential threat in order to quickly collect information which will enable the appropriate authorities to evaluate and confirm the existence of the threat and to respond by deployment of the appropriate personnel and materiel needed to counteract the threat and limit its damage potential. Effective response to a threatening incident is complicated by several factors. First, is the diversity of the potential threats which, depending on their nature, requires response from one or more of many different specialized public services and agencies, any of which may operate at a local, state or federal level.

The nature of many current threats to public safety and security calls for the coordinated intervention and rapid response of several public agencies, each having a different but essential area of expertise and responsibility. These agencies may be geographically distant from each other and from the scene of a particular incident, and may operate at various governmental levels. For example, the release of a potentially flammable gas or liquid may require the intervention of a hazardous materials (HAZMAT) team with expertise in the identification and handling of flammable or explosive substances, a fire department ready to contain a possible conflagration at the site; ambulances and paramedic teams ready to attend to potential casualties, police to close off the area and evacuate persons in the threat area, and federal investigative agencies if the cause of the incident is of a suspect nature. Different sets and combinations of agencies may need to be contacted depending on the nature of a particular public safety incident.

A first responder at the location of an incident is rarely in a position to directly notify the various agencies and services who are in the best position, in terms of geographic proximity, availability and training of its personnel, and legal jurisdiction, to name just a few factors, to deal effectively with a particular hazard or threat.

The first responder, who may be a private security guard or local police person summoned to the incident scene, typically notifies a first agency, chosen at the responder's standing instructions or personal judgment. This first agency arrives at the location and after assessing the nature and scope of the threat in turn contact additional agencies. This is often a cumbersome process involving individual communications during which the nature and location of the incident must be communicated over a voice channel, the readiness and availability of the requested support must be determined, and if unavailable, additional contacts made in search of the desired support.

For example, if an unknown but suspect substance, such as a white powder, is found in a public area such as an airport terminal, expert examination and analysis of a sample of the suspect substance is necessary in order to determine whether it is a harmless powder such as talcum or potentially lethal anthrax. Under present procedures, a sample of suspect biological material is taken by the most expedient transport, such as a helicopter, to the nearest laboratory able to make the analysis. After all pertinent agencies have been alerted and have arrived at the scene, activity is halted until the remote laboratory makes an identification and returns the information to those at the scene. Even then, further delays may be caused by the need to pass on that information to higher echelon decision makers not at the scene of the incident. If such an event occurs at a large transport terminal such as an airport, bus or train station, all traffic in and out of that location may have to be suspended and all persons in the area evacuated, causing considerable disruption and economic loss.

A continuing need exists for a system which will improve the allocation and deployment of resources in response to incidents involving potential threats to public safety and security by more rapidly and efficiently directing and distributing information from the scene of such an incident to the public service agencies best equipped and most readily available for dealing with particular incidents.

SUMMARY OF THE INVENTION

This invention generally relates to data communications and distribution systems and more particularly concerns a system featuring a portable digital computing device or digital assistant, for convenience referred to as a PDA, physically carried or otherwise deployed by a person referred to as a local user. The PDA is enabled for local, relatively short range communications with one or more peripherals and is also enabled for communications with long distance carrier networks such as cellular networks. The local user may be equipped with one or more peripheral devices such as environmental sensors, imaging devices or voice communications devices. The PDA is configured and programmed for seamlessly interfacing the local user and any peripheral devices deployed by the same to one or multiple pre-designated recipients who may be located at arbitrarily remote locations from the local user. Information locally collected and delivered to the PDA by these peripherals is forwarded through the PDA to the designated recipients by any of several possible conduits which, in a preferred form of the invention, are selected automatically based on current availability by the PDA.

An information routing program resident on the PDA device directs collected information to designated recipients. Preferably, the routing program can be configured by the user or remotely by a system controller to modify the recipient or recipients of the locally collected information.

The PDA may interface with one or more locally deployed peripherals on a hardwired plug-and-play basis or by automatic wireless log-on.

The transmission by the PDA of the collected information is preferably made by way of existing wireless radio frequency communications networks such as cellular and satellite communication s systems, but can also be made via telephone modem, broadband cable or optical fiber links.

In general, this invention is a system for rapid distribution of information collected by a local user at an event location to one or more remote locations which may be control centers of public agencies charged with responding to matters affecting the public well being, centers for scientific study of collected information, or centers for political decision making.

The invention involves a field deployable, preferably portable computer which may be in the form of a hand held personal digital assistant or PDA to be carried by the local user to the location of an incident. The PDA preferably is configured with wireless network communications capability for both transmission and reception of data and voice messages through one or more wireless communications networks at the event location.

A software application is resident on the PDA and may include an initialization program, a local communications and data collection program, and a remote communications program. The initialization program may include, for example, local user identification and log-in, and information as to the geographical location of an incident. The latter may be derived by a global positioning system (GPS) receiver interfaced to the PDA for precise real-time localization of the PDA and consequently of the local user.

The local communications program may feature a local user status query program of a type which will be better described below, a local user voice communications channel such as a link wired or wireless to a microphone equipped headset worn by the local user, and a wireless interface for communication with one or more local data collection peripherals. The data collection peripherals may be of widely diverse nature and capability, including chemical, biological and environmental sensors; imaging devices such as video cameras and specialized imaging devices such as digital imaging microscopes, remotely operated robotic cameras, fiber optic digital image acquisition devices for inspection of restricted spaces, listening devices including directional microphones of various types and wiretap devices, as well as sensors for continuously or periodically monitoring the physical condition of the local user, as by pulse rate sensing.

The remote communications program may comprise a communications routing program by which the choice of information recipients may be preset on the PDA along with a choice of preferred and backup information transmission and distribution channels, such as a designation of preferred wireless communications networks and of fall back alternatives in the event that a preferred network becomes unavailable. The remote communications routing program also has inputs for routing program instructions for routing the locally collected data by a choice of options such as remote operator, by remote agency or location, by wireless network or by all available options, for example. The PDA is preferably configured for automatically logging onto a second or fall back wireless communications networks in the event that a preferred, first wireless communications networks becomes unavailable to the PDA. A local monitoring program may be provided for locally processing data and information collected by the various peripherals and sensors associated with the PDA and, if so programmed, issuing alert signals to preset recipients in the event that any of the conditions or parameters being monitored by the peripherals or sensors ranges beyond preset acceptable limits. Also part of the remote communications program may be a data logging and reporting program operating to format and organize the information being collected in a desired manner, including data compression and encryption, for efficient transmission and consumption by the designated recipients.

The local user status query program of the local communications program periodically prompts the local user operating the PDA for a status input, such as pushing a key on the PDA, and transmitting the status input to a remote monitoring location, and sending an alarm signal to the remote monitoring location in the absence of such a status input responsive to the periodic prompting.

The PDA's wireless local interface for communication with local data collection peripherals may include one or more generally accepted standards such as the 802.11 standard and the Blue Tooth. The PDA may also be configured and programmed for automatically linking or logging-in data collection peripherals within effective communications range of the PDA.

The application resident on the PDA allows a user or controller to selectively enable different features and capabilities of the application. For example, the local user status query feature may be disabled when not needed, for instance, where the condition of the local user is being adequately monitored by other means, or under circumstances where the distraction of the periodic status request is undesirable.

The invention contemplates both hardware and software as well as the method of operating the same for the purpose of improved collection and distribution of information at incident locations for more effective response by authorities and agencies charged with dealing with such incidents.

These and other improvements, features and advantages of the present invention will be more fully understood by reference to the following detailed description of the preferred embodiment in conjunction with the accompanying drawings.

DETAILED DESCRIPTION OF THE PREFERRED EMBODIMENT

Figure 1:
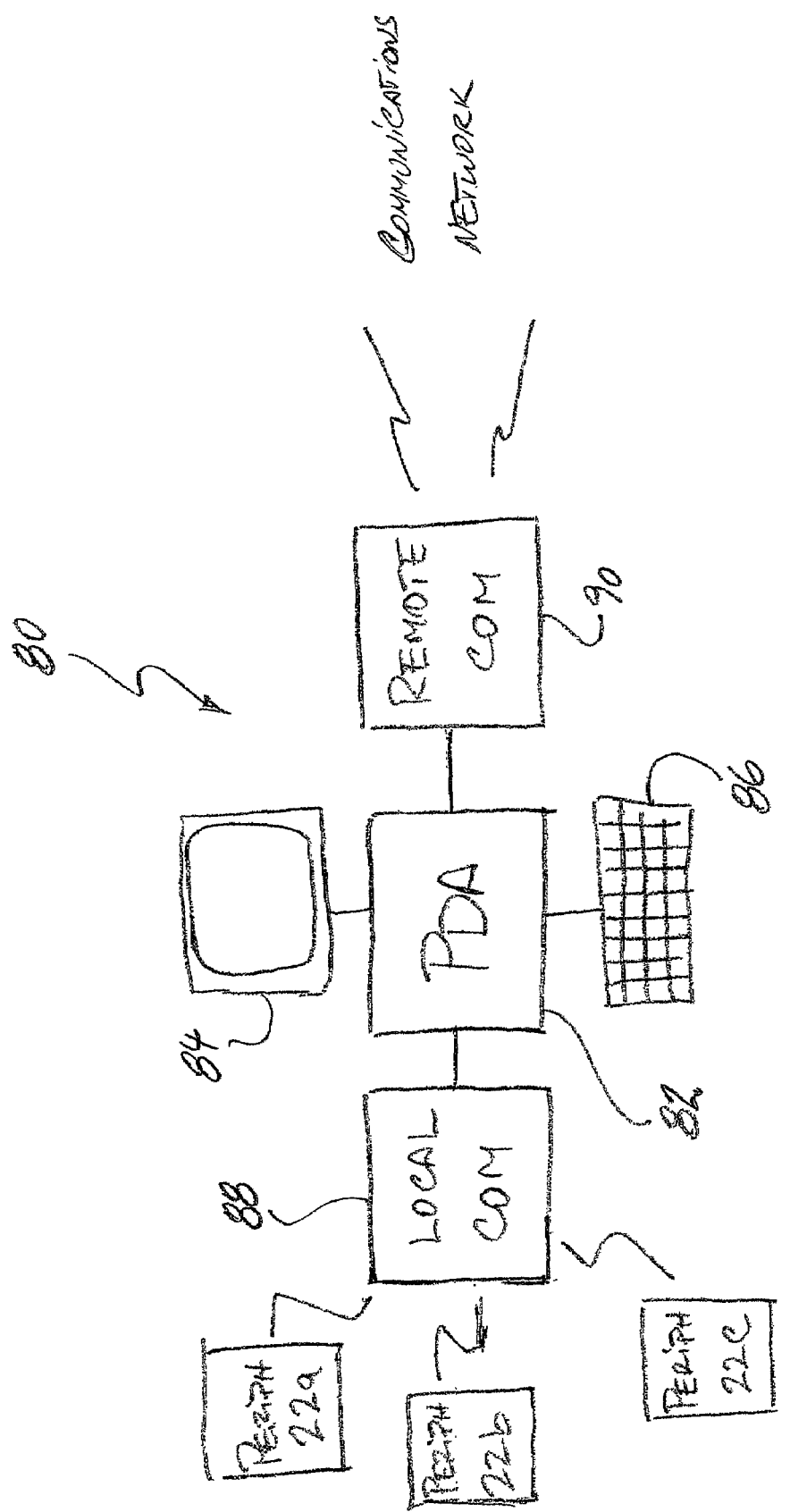
FIG. 1 is a simplified block diagram of the field deployable data collection and communication system (PDA) according to this invention.

With reference to FIG. 1 of the accompanying drawings, the field deployable data collection, computing and communications device, for convenience referred to as the PDA (Personal Digital Assistant) and generally designated by numeral 80 includes a main microprocessor based data processing system 82 including suitable non-volatile data storage such as a magnetic hard disk for storage of software applications, programs, and data, which forms the basis hardware portion of the system. The processing system 82 is in general a microcomputer and may be of essentially conventional design with inputs and outputs for a display or screen 84, and a keypad or keyboard 86.

The PDA 80 is enabled for relatively short range wireless communication with one or more peripheral devices 22a, 22b, 22c, for example, of a type which will be explained in more detail below, and which are deployed locally to the PDA, at ranges up to a few hundred feet but often much less than that. The PDA's local communications hardware 88 may be generally conventional and in compliance with one of the accepted short range wireless standards such as 802.11 or the Motorola Blue Tooth standard. Such communications hardware 88 along with the software drivers and related communications software is widely available as off-the-shelf, plug-in boards or cards from many vendors.

The PDA 80 is further enabled for long distance communication via one or more telecommunications carriers including existing commercial, government or military communications networks, both wireless and wired, or satellite communications. The long distance or remote communications interface 90 may include, for example, a cellular telephone device equipped for both voice and data transmission by way of a suitable telephone modem, for example. The cellular telephone device communicates through the installed cellular communications grid and by simply dialing preprogrammed telephone numbers stored in a database on the PDA can establish voice communications with recipient parties throughout the world. The cellular connection also allows for reasonably fast transmission of data through a telephone modem or equivalent device. Data communication may also be simultaneous with voice communication using commercially available equipment. Alternate long distance communications devices may include a satellite telephone of the type having a foldable parabolic antenna which is aimed at a communications satellite in geostationary orbit, through which global communications may be established. Such satellite communications devices are also commercially available, and their interfacing to a general purpose computer such as the PDA is well understood. As yet another long range communications alternative, higher power 802.11 transceiver systems may be installed on the PDA 80 for communication through the rapidly growing 802.11 broadband radio frequency data communications networks which typically are in turn connected for broadband internet access, thereby allowing for wireless high speed communications via the internet by the PDA 80. In a preferred form of the invention the PDA is equipped for at least two alternate forms of long distance communications, such as wireless internet access and cellular telephone communications. Furthermore, for each of the alternate forms of communications there are, in many localities, more than one network of each type, such as two or more cellular telephone networks and several wireless internet networks. The communications software resident on the PDA 80 is configured for periodically verifying availability of a preferred communications network, and if that networks becomes unavailable, to automatically log on to an alternate network available in the PDA's locality.

Figure 2:
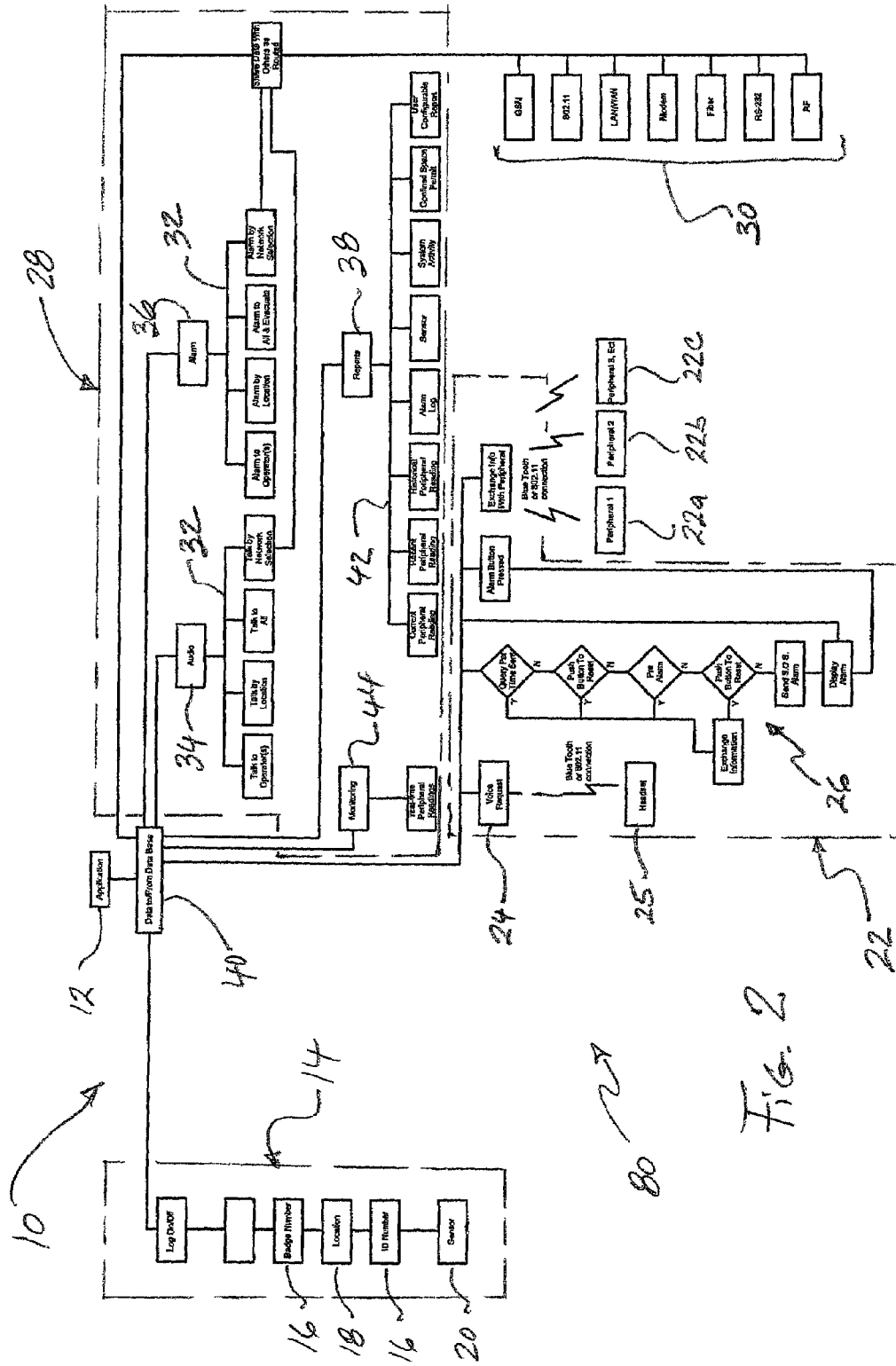
FIG. 2 is a functional block diagram of a typical information processing and wide area distribution according to this invention.

Turning now to FIG. 2, the Figure shows in functional bloc diagram form the PDA 80 of FIG. 1. Numeral 10 generally designates the system of digital processing and communications hardware and associated software at least partly resident on the hardware, and which is configured and constructed to be compact and relatively lightweight for reasonably convenient physical transport by a single person as PDA 80. Optimally, the system 10 is physically configured as a handheld unit of the type commonly referred to as PDAs or Personal Digital Assistants. The aim is to provide a unit which can be carried and is field deployable by one person, who will be referred to as the local user in the following description. Although the combined hardware and software system will be referred to by the term PDA it should be understood that the system may have other physical formats provided that it is reasonably field deployable.

The system 10 runs under application 12 which includes several sub programs including initialization program 14 having inputs 16 for entry of the local user's identification such as employee I.D., badge number or the like. A location input 18 is provided for entry of the geographical location of the incident at hand. The location entry may be descriptive, such as "Terminal 1 LAX" or may be a set of coordinates. The latter may be derived by a GPS receiver appropriately interfaced to the location input 18 for providing precise and continuous or periodic real time location data for transmission to designated recipients and for logging into a location database file on the PDA. A sensor log-in input 20 is provided by which one or more sensor peripherals 22a, 22b, 22c, etc., whether wireless or otherwise, may be acknowledged and linked for data input to the PDA. The same inputs may be used for logging-off of the local user and peripherals.

A local communications program generally designated by numeral 22 and running under application 12 provides at least one radio frequency voice communications channel 24 for two-way voice messaging between the local user and the PDA which for this purpose serves as a communications repeater between a headset 25 worn by local user and the remote communications interface of the PDA used for linking to a radio frequency communications network or other long distance communications conduit such as a telephone modem/broadband cable/optical fiber link. A subprogram of the local communications program is a local user status request program designated generally by numeral 26. This user status monitoring feature is the subject of U.S. Pat. No. 5,568,121 issued to this applicant, and the specification of that patent is incorporated by this reference as if fully set forth herein.

A remote communications program generally designated by numeral 28 includes a long distance or remote communications routing program which operates for distributing information collected locally by the PDA to a set of pre-designated recipients, some or all of who may be at arbitrarily remote geographic locations from the PDA location. The set of pre-designated recipients is normally preset by a system administrator. The particular recipients and their contact information is entered in a database associated with the top application 12. Contact information may include the full range of available telecommunication services, including but not limited to internet based e-mail, telephone services; paging services; wireless network services. The remote communications program is configured for paging, dialing, or e-mailing each designated recipient, and the recipient may be contacted by one or more of these telecommunication means, some of which are designated by numeral 30 in FIG. 1, or redundantly by some or all of them. The remote communications program 28 may be programmed with multiple sets of recipients, each set chosen for response to a particular type of emergency or public safety incident or situation, and for different geographic locations of such incidents to take into account and minimize travel and response time. Mapping software may be incorporated into the remote communications program in cooperation with a GPS receiver in order to automatically select the nearest response available for a particular situation. The nature of the incident is entered as an input to the PDA and may be selected from a menu presented to the local user on a display or screen 84 of the PDA 80 or by pressing one of several dedicated keys on a keypad 86 associated with the PDA, as suggested in FIG. 1.

The remote communication program 28 further provides a hierarchy of communications options 32 allowing the local user and the PDA to communicate with the individual operators or controllers of the agencies on the recipient list, or with all such controllers simultaneously, or by all available public safety agencies within a geographic area, or by broadcasting to all public service agencies operating on a particular network such as a shared radio frequency or other multi-agency shared communications channel.

The type of information transmitted by the remote communications program may include any one or a mix of voice communications 34, data output provided by any of the peripherals interfacing with the PDA or alarm signals 36 intended to bring about a response to the location of the PDA, as suggested in FIG. 1.

Additionally, the remote communication program 28 may include reporting program 38 with sub-programs for formatting, encoding, summarizing and reporting the data and information collected locally for efficient transmission and presentation to the designated recipients. To this end, one of these sub-programs may be a local monitoring program 44 adapted to collect real-time data output provided by the peripherals and entering the collected data into the database of application 12. A data logging and reporting program is also provided for formatting the collected data into report formats suitable for presentation to recipients or for review on location by the local user and others working with the local user at the incident scene. Exemplary logs and reports 40 are shown in FIG. 2. The data output for transmission to the recipients may be pre-processed by reporting program 38 and routed through the database 40 associated with application 20.

It should be understood that the grouping of the various sub-programs under particular programs and applications is made for convenience and by way of example, but is rather arbitrary and can be changed without significant effect on the overall operation of the system.

Still other changes, modifications and substitutions to the described embodiment will be apparent to those having ordinary skill in the art without departing from the scope and spirit of the invention which is defined by the following claims.

What is claimed is:

1. A method for responding to an incident potentially involving release of hazardous substances and for rapid distribution of information collected at the incident location by a local user to remote recipients for improved response to the incident, comprising:

deploying a portable computer at the incident location including wireless network communications transceiver means on said computer for establishing two-way communication with one or more wireless communications networks available at the event location;

deploying a plurality of portable local data collection peripherals remotely to said mobile computer at said incident location each of said peripherals being enabled for wireless communication with said portable computer and said mobile computer being configured for automatically recognizing and logging-in said data collection peripherals within effective communication range of the mobile computer;

said data collection peripherals once deployed being operative for collecting local data without attention by said local user;

a communication routing program on said portable computer for routing locally collected data from said plurality of diverse portable local data collection peripherals for wireless transmission to one or more destinations selectable by said local user; and wherein a local user status query program periodically prompts the local user for a status input, and transmits the status input to a remote monitoring location, and actuates an alarm signal to the remote monitoring location in the absence of such a status input responsive to the periodic prompting.

2. The method of claim 1 wherein said data collection peripherals are chosen from the group comprised of chemical, biological and environmental sensors; imaging devices including video cameras, digital imaging microscopes, remotely operated robotic cameras, and fiber optic digital image acquisition devices for inspection of restricted spaces; listening devices including directional microphones and wiretap devices, and sensors for continuously or periodically monitoring the physical condition of the local user, as by pulse rate sensing.

3. The method of claim 1 further comprising establishing two-way wireless voice communication linking said local user to said portable computer for wireless transmission to said one or more destinations.

4. The method of claim 1 wherein said wireless network communications transceiver means comprises control means for automatically logging onto a second one of said wireless communications networks in the event that a first one of said wireless communications networks becomes unavailable to said transceiver means.

5. The method of claim 1 wherein said transceiver means is configured with wireless network communications capability for both transmission and reception of data and voice messages through one or more wireless communications networks at the event location.

6. The method of claim 1 further comprising the step of providing a local monitoring program on said mobile computer for locally processing data and information collected by said peripherals and, if so programmed, issuing alert signals to preset ones of said remote recipients in the event that any of the conditions or parameters being monitored by the peripherals ranges beyond preset acceptable limits.

7. The method of claim 1 wherein said communications routing program further comprises a data logging and reporting program operative to format and organize information collected by said peripherals in a desired manner, including data compression and encryption, for efficient transmission to and consumption by said remote recipients.

8. The method of claim 1 wherein said local user status query may be disabled when not needed or under circumstances where the distraction of the periodic status query is undesirable.

9. The method of claim 1 wherein said wireless network communications transceiver means is enabled for long distance communication via one or more telecommunications carriers including existing commercial, government or military communications networks, both wireless and wired, satellite communications, and cellular telephone networks.

10. The method of claim 1 wherein said portable computer is enabled for wireless communication via a first wireless communication protocol with said local data and via a second wireless communication protocol with said remote destination.

* * * * *